United States Patent Office 3,291,823
Patented Dec. 13, 1966

3,291,823
4-CARBOXYMETHYLAMINO-3-NITRO-1-METHYL-AMINOBENZENE AS A DYEING AGENT
Gregoire Kalopissis, Paris, and Raymond Bugaut, Boulogne-sur-Seine, France, assignors to L'Oreal, a corporation of France
No Drawing. Application Oct. 18, 1961, Ser. No. 146,006, now Patent No. 3,188,346, dated June 8, 1965, which is a division of application Ser. No. 826,454, July 13, 1959, now Patent No. 3,117,911. Divided and this application Oct. 23, 1964, Ser. No. 412,275
Claims priority, application France, Apr. 23, 1959, 792,972, Patent 1,253,228
1 Claim. (Cl. 260—518)

This application is a division of applicants' prior application Serial No. 146,006, filed October 18, 1961, now Patent No. 3,188,346, issued June 8, 1965, which application was a division of applicants' prior application Serial No. 826,454, now Patent 3,117,911, claiming the priority of French application Serial No. 792,972, filed April 23, 1959.

This invention relates to dyes suitable for dyeing hair, e.g. human hair, and other keratinous fibers, and to their production and use.

It is well known to use nitroparaphenylenediamine as a product in the composition of dyeing solutions for hair or other keratinous fibers.

It is known more especially that this dyestuff has the advantage that, on the one hand, it has a great affinity in the cold for keratinous fibres, while on the other hand it can in some cases be readily eliminated, which is very advantageous when it is desired to effect only a temporary dyeing. On the other hand, this dyestuff has the considerable disadvantage that only orange-red shades can be obtained therewith.

It is an object of the present invention to provide dyes which can be used for dyeing hair in deeper shades than those yielded by nitroparaphenylenediamine, for example in colours verging upon blue-violet.

It is well known that it is desirable to be able to employ dye compositions which are capable of dyeing hair in the deepest possible natural shades with the minimum number of dyestuffs possessing a similar molecular configuration, whereby selectivity on certain hairs is minimized.

According to a first feature of the present invention there are provided as new dyes, suitable for dyeing hair or other keratinous fibres, compounds of the general formula:

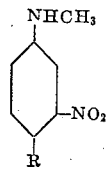

wherein R represents an amino ($-NH_2$) group or carboxymethylamino ($-NHCH_2COOH$) group.

The dyes thus defined, when applied to human hair, are capable of giving shades verging upon blue-violet when the operation is carried out at an acid, neutral, or alkaline pH, e.g. a pH from 2 to 9.

It has been observed more particularly that the substitution of a hydrogen atom by a $CH_3$ radical in the $NH_2$ group which is situated in meta-position in relation to the $NO_2$ group of the nitroparaphenylenediamine produces a deepening of the shade and thus constitutes a principal advantage of the dyes according to the present invention.

It has also been observed that if, in accordance with the invention, one molecule of monochloroacetic acid is reacted with 4-amino-3-nitro-1-methylaminobenzene, a dyestuff is obtained which, when employed at a pH between 2 and 9, can give particularly interesting shades which verge upon blue-violet.

These dyes not only give deeper shades than nitroparaphenylenediamine but also give aqueous solutions whose absorption spectra in the visible range have confirmed the deeping effect observed on the hair.

According to a further feature of the present invention there is provided a process for the production of dyes of the general formula set forth above which comprises nitrating N-methylacetanilide by treatment with a mixture of sulphuric and nitric acids, reducing the 4-nitro-N-methylacetanilide thus obtained to the corresponding 4-amino compound, acetylating the said 4-amino compound, nitrating the product, subjecting the N-methyl-N-acetyl-N'-acetyl-meta-nitroparaphenylenediamine thus obtained to deacetylation to produce 4-amino-3-nitro-1-methylaminobenzene and, if desired, treating this product with monochloroacetic acid to produce 4-carboxymethylamino-3-nitro-1-methylaminobenzene.

The foregoing processes may be schematically illustrated as follows:

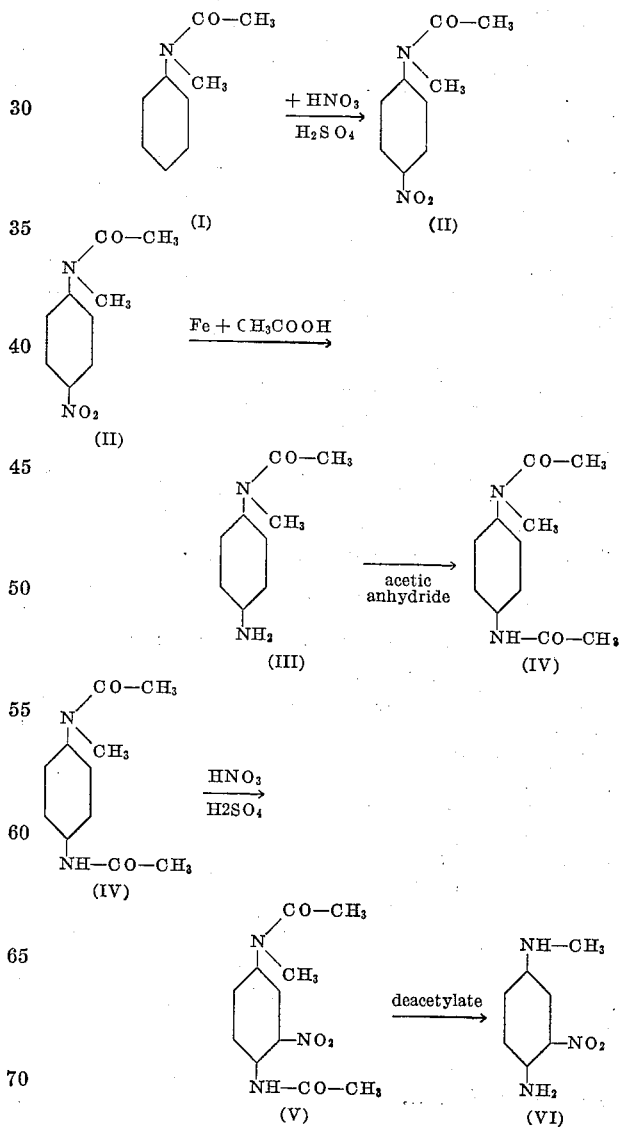

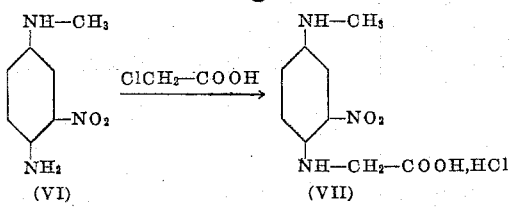

The following examples illustrate the production of the new dyes and their use in dyeing:

EXAMPLE I

*Preparation of 4-amino-3-nitromethylaminobenzene*

(a) 149 g. of N-methylacetanilide are dissolved in 750 cc. of 96% by weight sulphuric acid, the temperature being maintained at a value below 5° C., and there is then poured dropwise into this solution a mixture consisting of 105 g. of 96% by weight sulphuric acid and 105 g. of nitric acid having a density of 1.38.

The mixture is run on to ice, and the precipitate is separated and washed with iced water. The product is then dried in an oven. There is thus obtained product II in a yield of 80% of theory.

(b) There are successively introduced into three-litre round-bottomed flask provided with a stirrer and a reflux condenser 1600 cc. of water, 16 cc. of glacial acetic acid and 480 g. of iron filings. The temperature is then raised to 90° C. and 310 g. of the previously obtained product II are progressively introduced.

The product is neutralized with sodium carbonate, filtered, washed with boiling water and cooled, and there are added to the filtrate 500 g. of acetic anhydride. The mixture is maintained at 80° C. for about 30 minutes. After cooling, the product is neutralized with a caustic soda solution to a pH which is alkaline to phenolphthalein.

The product, which is Compound IV, is filtered, washed with water and then dried in vacuo, the yield being 88% of theory.

(c) 92.5 g. of this product are dissolved in 410 cc. of 96% by weight sulphuric acid, and a mixture of 372 g. of 96% by weight sulphuric acid and 27.1 g. of nitric acid having a density of 1.52 is added dropwise, the temperature being maintained at about 0° C.

When the reaction has ended, the product is poured on to ice and then diluted with water. It is thereafter heated for 1 hour at about 90–95° C., cooled and then neutralized with ammonia. There is thus obtained 4-amino-3-nitro-1-methylaminobenzene (Compound VI) in a yield of 85% of theory. This substance melts at 115–116° C. after recrystallization from water.

EXAMPLE II

*Preparation of 4-carboxymethylamino-3-nitro-1-methylaminobenzene*

(a) Into a three-necked round-bottomed flask provided with a thermometer, a dropping funnel, a reflux condenser and a mechanical stirrer are introduced 0.1 mole of 4-amino-3-nitro-1-methylaminobenzene, 0.15 mole of precipitated calcium carbonate and 150 cc. of water.

The mixture is brought to boiling point and an aqueous solution of 0.125 mole of monochloroacetic acid is then added dropwise. When the evolution of carbon dioxide has stopped, the reaction mixture is acidified by the addition of concentrated hydrochloric acid, and then cooled to 0° C.

The hydrochloride of 4-carboxymethylamino-3-nitro-1-methylaminobenzene (Compound VII) precipitates. This compound, after recrystallization from water, melts with decomposition at about 104–105° C. It crystallizes with 1 molecule of water.

The following examples illustrate the use of the dyestuffs thus obtained for the dyeing of hair:

EXAMPLE III

A lock of white hair is dipped into 10 cc. of a solution consisting of:

4-amino-3-nitro-1-methylaminobenzene, 0.1 g.
20% ammonia, q.s. for pH 8.
Water, q.s. for 10 cc.

The lock of hair is left in contact with the solution for 20 minutes at 20° C. It is then shampooed, rinsed with water and dried with warm air. It is tinted an intense reddish violet.

EXAMPLE IV

A lock of white hair is dipped into 10 cc. of a solution consisting of:

4-amino-3-nitro-1-methylaminobenzene, hydrochloride, 0.1 g.
Water, q.s. for 10 cc.

The solution thus obtained has a pH of about 7.2.
The lock of hair is left in contact with the solution for 20 minutes at about 20° C. It is then shampooed, rinsed with water and dried with warm air (about 35–40° C.).
A beautiful reddish-violet shade is obtained.

EXAMPLE V

A lock of white hair is dipped into 10 cc. of a solution consisting of:

4-amino-3-nitro-1-methylaminobenzene, 0.1 g.
Lactic acid, q.s. for pH 6.
Water, q.s. for 10 cc.

The lock of hair is left in contact with the solution for 20 minutes at about 20° C. It is then shampooed, rinsed with water and dried in the air.
The shade obtained is reddish violet.

EXAMPLE VI

A lock of white hair is dipped into 10 cc. of a solution consisting of:

4-carboxymethylamino-3-nitro-1-methylaminobenzene, hydrochloride, 0.5 g.
20% ammonia, q.s. for pH 8.
Water, q.s. for 10 cc.

The lock of hair is left in contact with the solution for 20 minutes at about 20° C. It is then shampooed, rinsed with water and dried in the air.
The shade obtained is pink-beige.

EXAMPLE VII

A lock of white hair is dipped into 10 cc. of a solution consisting of:

4-carboxymethylamino-3-nitro-1-methylaminobenzene, hydrochloride, 0.5 g.
Water, q.s. for 10 cc.

The solution thus obtained has a pH of about 2.
The lock of hair is left in contact with the solution for 20 minutes at about 20° C. It is then shampooed, rinsed with water and dried in the air.
The shade obtained is blue-violet.

EXAMPLE VIII

A lock of hair is dipped into a solution having an acid pH and consisting of:

| | G. |
|---|---|
| 4-carboxymethylamino-3-nitro-1-methylaminobenzene, hydrochloride | 0.12 |
| Crystallized sodium acetate | 0.12 |
| Water, q.s. for 10 cc. | |

The lock is left in contact with the solution for 20 minutes at about 20° C. It is then shampooed, rinsed with water and dried in the air.

The shade obtained is blue-violet.
What is claimed is:
A dyestuff suitable for use in dyeing of hair or other keratinous fibres, having the formula:
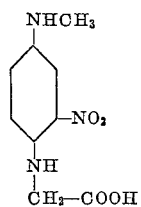
References Cited by the Examiner
P. Karrer: Organic Chemistry, page 570 (1950).
Wagner et al.: Synthetic Organic Chemistry (1953), pp. 666 to 668 relied on.
R. K. JACKSON, *Primary Examiner.*
LORRAINE A. WEINBERGER, *Examiner.*
L. A. THAXTON, *Assistant Examiner.*